US009316558B2

(12) United States Patent
Jackson et al.

(10) Patent No.: US 9,316,558 B2
(45) Date of Patent: Apr. 19, 2016

(54) SYSTEM AND METHOD TO DIAGNOSE FUEL SYSTEM PRESSURE SENSOR

(71) Applicant: GM Global Technology Operations LLC, Detroit, MI (US)

(72) Inventors: Robert Jackson, Brighton, MI (US); John F. Van Gilder, Webberville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 336 days.

(21) Appl. No.: 13/909,424

(22) Filed: Jun. 4, 2013

(65) Prior Publication Data
US 2014/0352658 A1    Dec. 4, 2014

(51) Int. Cl.
*G01L 27/00* (2006.01)
*F02D 41/00* (2006.01)
*F02D 19/02* (2006.01)
*F02M 25/08* (2006.01)
*F02D 19/06* (2006.01)
*F02D 41/22* (2006.01)

(52) U.S. Cl.
CPC ........... *G01L 27/007* (2013.01); *F02D 41/0037* (2013.01); *F02D 19/025* (2013.01); *F02D 19/027* (2013.01); *F02D 19/0621* (2013.01); *F02D 19/0628* (2013.01); *F02D 2041/223* (2013.01); *F02D 2041/224* (2013.01); *F02M 25/0809* (2013.01); *F02M 25/0836* (2013.01); *Y02T 10/40* (2013.01)

(58) Field of Classification Search
CPC ........... F02M 25/0809; F02M 25/0836; F02D 2041/223; F02D 2041/224; F02D 19/025; F02D 19/027; F02D 19/0621; F02D 19/0628; F02D 41/0037; F02D 41/004; G01L 27/007
USPC .......................................... 73/114.39, 114.43
See application file for complete search history.

(56) References Cited

U.S. PATENT DOCUMENTS 3,396,666 A   8/1968   Moochhala et al.
4,751,501 A   6/1988   Gut
5,150,689 A   9/1992   Yano et al.
(Continued)

FOREIGN PATENT DOCUMENTS

DE    4321694 A1    1/1995
DE    19502776 C1   6/1996
(Continued)

OTHER PUBLICATIONS

U.S. Appl. No. 13/909,424, filed Jun. 4, 2013, Jackson, et al.
(Continued)

*Primary Examiner* — Stephen K Cronin
*Assistant Examiner* — Kevin R Steckbauer

(57) ABSTRACT

A system includes an ignition detection module, a pressure sensor, a pressure variation module, and a pressure sensor diagnostic module. The ignition detection module detects when an engine is started. The pressure sensor generates a first pressure signal indicating a first pressure within a fuel system of the engine when the engine is started and when a purge valve of the fuel system is closed. The pressure variation module determines an amount of variation in the first pressure signal over a first period. The pressure sensor diagnostic module determines a state of the pressure sensor based on the amount of variation in the first pressure signal over the first period.

18 Claims, 7 Drawing Sheets

(56) References Cited

U.S. PATENT DOCUMENTS

| | | | |
|---|---|---|---|
| 5,158,054 | A | 10/1992 | Otsuka |
| 5,317,909 | A | 6/1994 | Yamada et al. |
| 5,347,971 | A * | 9/1994 | Kobayashi ......... F02M 25/0809 123/198 D |
| 5,477,837 | A * | 12/1995 | Ikebuchi ............... F02D 41/221 123/198 D |
| 5,606,311 | A | 2/1997 | Polidan et al. |
| 5,616,157 | A | 4/1997 | Mead et al. |
| 5,750,888 | A | 5/1998 | Matsumoto et al. |
| 5,808,189 | A * | 9/1998 | Toyoda ................. F02D 41/222 73/114.37 |
| 5,895,859 | A | 4/1999 | Sawada et al. |
| 6,012,438 | A * | 1/2000 | Joos .................... F02D 41/1454 123/198 D |
| 6,016,690 | A | 1/2000 | Cook et al. |
| 6,038,912 | A * | 3/2000 | Isobe ................... G01L 27/007 73/1.59 |
| 6,047,692 | A | 4/2000 | Toyoda |
| 6,164,123 | A | 12/2000 | Corkill |
| RE37,250 | E * | 7/2001 | Kayanuma ......... F02M 25/0809 123/198 D |
| 6,311,548 | B1 | 11/2001 | Breidenbach et al. |
| 6,363,921 | B1 | 4/2002 | Cook et al. |
| 6,371,089 | B1 * | 4/2002 | Matsuoka .............. B60K 6/365 123/519 |
| 6,467,463 | B2 | 10/2002 | Kitamura et al. |
| 6,508,235 | B2 | 1/2003 | Fabre |
| 6,526,760 | B2 | 3/2003 | Fickel et al. |
| 6,536,261 | B1 | 3/2003 | Weldon et al. |
| 6,637,416 | B2 * | 10/2003 | Wakahara ......... F02M 25/0809 123/198 D |
| 6,761,154 | B2 | 7/2004 | Takagi et al. |
| 6,789,523 | B2 * | 9/2004 | Oki .................... F02M 25/0827 123/198 D |
| 6,874,523 | B2 | 4/2005 | Yoshihara et al. |
| 6,932,068 | B2 * | 8/2005 | Osanai ................. F02D 41/004 123/520 |
| 6,970,775 | B2 | 11/2005 | Lederle et al. |
| 6,988,396 | B2 | 1/2006 | Matsubara et al. |
| 7,066,152 | B2 | 6/2006 | Stroia et al. |
| 7,107,971 | B2 | 9/2006 | Spink et al. |
| 7,121,265 | B2 * | 10/2006 | Joos .................... F02D 41/222 123/467 |
| 7,290,535 | B2 * | 11/2007 | Kimura ............. F02M 25/0818 123/518 |
| 7,383,826 | B2 | 6/2008 | Kano et al. |
| 7,438,060 | B2 * | 10/2008 | Mc Lain ............ F02D 41/0035 123/519 |
| 7,441,545 | B1 | 10/2008 | Fisher et al. |
| 7,444,234 | B2 | 10/2008 | Bauerle |
| 7,762,126 | B2 * | 7/2010 | Shibuya ............ F02D 41/0032 123/198 D |
| 7,810,475 | B2 * | 10/2010 | Peters ................ F02M 25/0836 123/519 |
| 7,853,416 | B2 * | 12/2010 | Nakada .............. G01F 25/0038 700/282 |
| 8,033,271 | B2 * | 10/2011 | Yoshimura ......... F02D 41/0032 123/520 |
| 8,108,127 | B2 | 1/2012 | Grunwald et al. |
| 8,155,917 | B2 * | 4/2012 | Maegawa ........... F02M 25/0818 702/140 |
| 8,327,695 | B2 | 12/2012 | Jackson et al. |
| 8,342,157 | B2 * | 1/2013 | Der Manuelian .. F02M 25/0809 123/495 |
| 8,353,273 | B2 | 1/2013 | Mc Lain et al. |
| 8,560,158 | B2 | 10/2013 | Wang et al. |
| 8,738,218 | B2 * | 5/2014 | Suda .................... F02D 41/20 701/30.2 |
| 8,935,081 | B2 * | 1/2015 | Jackson ............. F02M 25/0809 123/198 D |
| 9,038,489 | B2 * | 5/2015 | Jackson ............. F02M 25/0809 73/114.39 |
| 2001/0027682 | A1 | 10/2001 | Takagi et al. |
| 2001/0032626 | A1 | 10/2001 | Fabre |
| 2002/0046609 | A1 | 4/2002 | Ito |
| 2003/0075156 | A1 | 4/2003 | Morinaga et al. |
| 2003/0183206 | A1 | 10/2003 | Fujimoto et al. |
| 2003/0226549 | A1 | 12/2003 | Takagi et al. |
| 2004/0089063 | A1 | 5/2004 | Matsubara et al. |
| 2004/0089064 | A1 | 5/2004 | Kidokoro et al. |
| 2005/0240338 | A1 | 10/2005 | Ardisana |
| 2006/0090553 | A1 | 5/2006 | Nagasaki et al. |
| 2007/0089721 | A1 | 4/2007 | Amano et al. |
| 2007/0189907 | A1 | 8/2007 | Kunihiro et al. |
| 2008/0135025 | A1 | 6/2008 | Mc Lain |
| 2008/0190177 | A1 | 8/2008 | Wiggins et al. |
| 2009/0138173 | A1 | 5/2009 | Liu |
| 2009/0266147 | A1 * | 10/2009 | Maegawa ................ G01F 22/02 73/40.7 |
| 2009/0299561 | A1 | 12/2009 | Matsumoto |
| 2010/0224171 | A1 * | 9/2010 | Peters ................ F02M 25/089 123/520 |
| 2011/0011472 | A1 | 1/2011 | Mc Lain et al. |
| 2011/0123372 | A1 | 5/2011 | Itoh et al. |
| 2011/0197862 | A1 * | 8/2011 | Der Manuelian .. F02M 25/0809 123/521 |
| 2012/0097252 | A1 | 4/2012 | Mc Lain et al. |
| 2013/0184963 | A1 | 7/2013 | Jackson et al. |
| 2014/0260575 | A1 * | 9/2014 | Jackson ................ G01M 15/09 73/114.42 |
| 2014/0345574 | A1 * | 11/2014 | Haefele ............. F02M 25/0809 123/519 |
| 2015/0059870 | A1 * | 3/2015 | Iwaya ................ F02M 37/0076 137/351 |
| 2015/0159574 | A1 * | 6/2015 | Stack .................... F02D 41/222 701/104 |

FOREIGN PATENT DOCUMENTS

| | | |
|---|---|---|
| DE | 19630985 A1 | 3/1997 |
| DE | 19710981 A1 | 10/1998 |
| DE | 10037939 A1 | 6/2001 |
| DE | 10245158 A1 | 4/2003 |
| DE | 102010026655 A1 | 8/2011 |

OTHER PUBLICATIONS

Office Action dated Mar. 14, 2012 from German Patent Office for German Patent Application No. 102010026655.8; 7 Pages.
U.S. Appl. No. 13/350,141, filed Jan. 13, 2012, Jackson et al.
U.S. Appl. No. 13/651,533, filed Oct. 15, 2012, Jackson et al.
U.S. Appl. No. 13/832,766, filed Mar. 15, 2013, Jackson.
Office Action dated Dec. 17, 2014 from German Patent Office for German Patent Application No. 102013220186.9; 5 Pages.

* cited by examiner

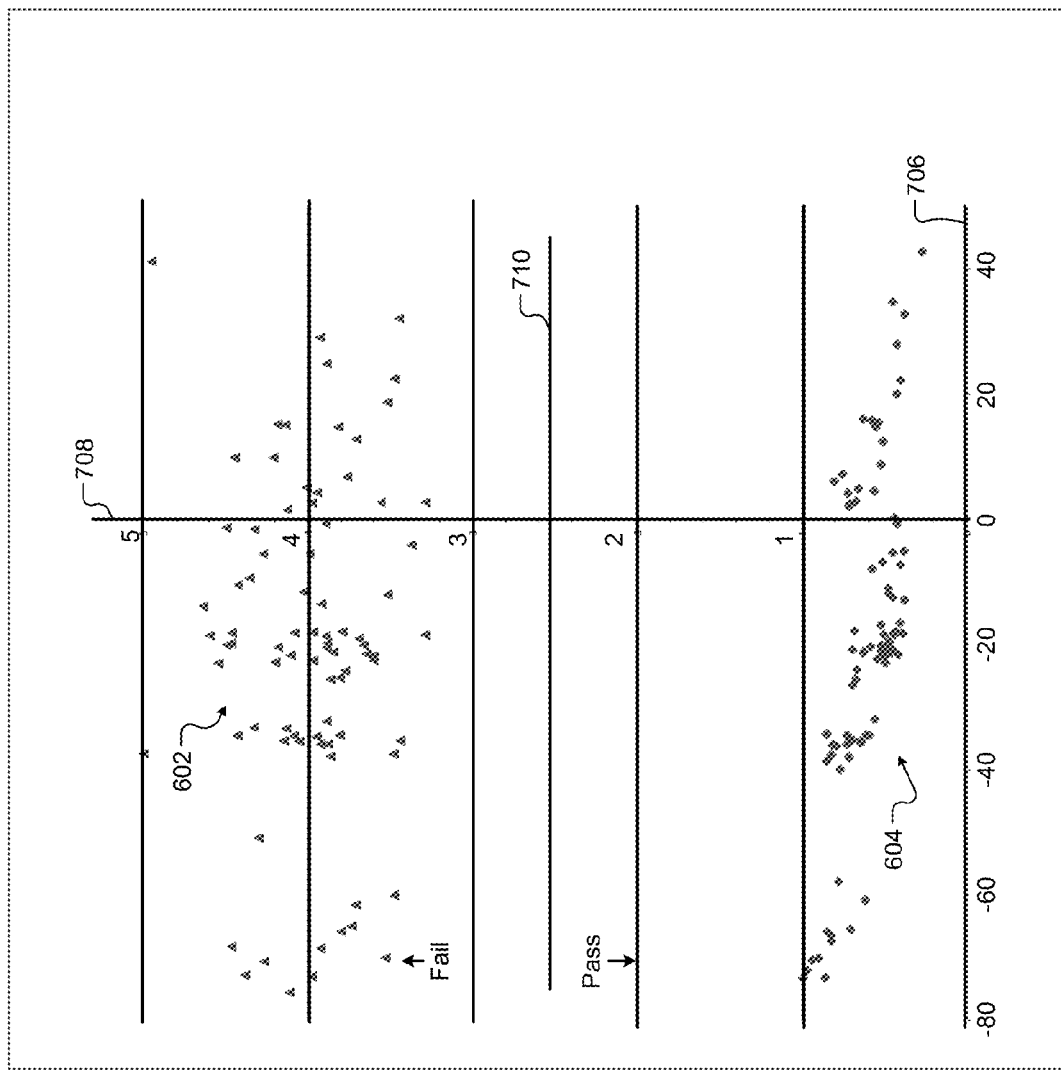

SYSTEM AND METHOD TO DIAGNOSE FUEL SYSTEM PRESSURE SENSOR

FIELD

The present disclosure relates generally to vehicle diagnostic systems and more particularly to a system and a method to diagnose a pressure sensor of a fuel system of a vehicle.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

In spark-ignition engines, spark initiates combustion of an air/fuel mixture provided to the cylinders. In compression-ignition engines, compression in the cylinders combusts the air/fuel mixture provided to the cylinders. Spark timing and air flow may be the primary mechanisms for adjusting the torque output of spark-ignition engines, while fuel flow may be the primary mechanism for adjusting the torque output of compression-ignition engines.

SUMMARY

A system comprises an ignition detection module, a pressure sensor, a pressure variation module, and a pressure sensor diagnostic module. The ignition detection module detects when an engine is started. The pressure sensor generates a first pressure signal indicating a first pressure within a fuel system of the engine when the engine is started and when a purge valve of the fuel system is closed. The pressure variation module determines an amount of variation in the first pressure signal over a first period. The pressure sensor diagnostic module determines a state of the pressure sensor based on the amount of variation in the first pressure signal over the first period.

In other features, the pressure variation module determines the amount of variation based on a difference between a current pressure reading and a previous pressure reading, an absolute value of the current pressure reading and the previous pressure reading, and a running total of the absolute value of the current pressure reading and the previous pressure reading over the first period.

In other features, the pressure sensor diagnostic module determines that the pressure sensor operates normally if the amount of variation in the first pressure signal is less than a first threshold and that the pressure sensor is faulty if the amount of variation in the first pressure signal is greater than or equal to the first threshold. The first threshold is determined based on a leakage rating of the purge valve.

In other features, the pressure sensor subsequently generates a second pressure signal indicating a second pressure within the fuel system when the purge valve of the fuel system is cycled at a duty cycle. The pressure variation module determines an amount of variation in the second pressure signal over a second period. The system further comprises a purge flow diagnostic module that diagnoses a fault associated with flow through the purge valve if the amount of variation in the first pressure signal is less than the first threshold and if the amount of variation in the second pressure signal is less than a second threshold.

In other features, the pressure variation module determines the amount of variation based on a difference between a current pressure reading and a previous pressure reading, an absolute value of the current pressure reading and the previous pressure reading, and a running total of the absolute value of the current pressure reading and the previous pressure reading over the second period.

In other features, the purge flow diagnostic module determines the second threshold based on a predetermined relationship between a flow restriction in the purge valve and the amount of variation.

In other features, the purge flow diagnostic module adjusts the amount of variation based on an amount of boost provided to the engine during the second period.

In other features, the purge flow diagnostic module determines the second threshold based on an amount of boost provided to the engine.

In other features, the system further comprises a valve control module that controls the duty cycle of the purge valve at a predetermined value during the second period.

In other features, the system further comprises a vent valve control module that opens a vent valve of the fuel system during the second period.

In still other features, a method comprises detecting when an engine is started; generating, using a pressure sensor, a first pressure signal indicating a first pressure within a fuel system of the engine when the engine is started and when a purge valve of the fuel system is closed; determining an amount of variation in the first pressure signal over a first period; and determining a state of the pressure sensor based on the amount of variation in the first pressure signal over the first period.

In other features, the method further comprises determining the amount of variation amount based on a difference between a current pressure reading and a previous pressure reading, an absolute value of the current pressure reading and the previous pressure reading, and a running total of the absolute value of the current pressure reading and the previous pressure reading over the first period.

In other features, the method further comprises determining that the pressure sensor operates normally if the amount of variation in the first pressure signal is less than a first threshold and that the pressure sensor is faulty if the amount of variation in the first pressure signal is greater than or equal to the first threshold, and determining the first threshold based on a leakage rating of the purge valve.

In other features, the method further comprises subsequently generating a second pressure signal indicating a second pressure within the fuel system when the purge valve of the fuel system is cycled at a duty cycle, determining an amount of variation in the second pressure signal over a second period, and diagnosing a fault associated with flow through the purge valve if the amount of variation in the first pressure signal is less than the first threshold and if the amount of variation in the second pressure signal is less than a second threshold.

In other features, the method further comprises determining the amount of variation based on a difference between a current pressure reading and a previous pressure reading, an absolute value of the current pressure reading and the previous pressure reading, and a running total of the absolute value of the current pressure reading and the previous pressure reading over the second period.

In other features, the method further comprises determining the second threshold based on a predetermined relationship between a flow restriction in the purge valve and the amount of variation.

In other features, the method further comprises adjusting the amount of variation based on an amount of boost provided to the engine during the second period.

In other features, the method further comprises determining the second threshold based on an amount of boost provided to the engine.

In other features, the method further comprises maintaining the duty cycle of the purge valve at a predetermined value during the second period.

In other features, the method further comprises opening a vent valve of the fuel system during the second period.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 7 is a graph illustrating an example of results of diagnostics of a fuel system pressure sensor performed according to the present disclosure.

In the drawings, reference numbers may be reused to identify similar and/or identical elements.

DETAILED DESCRIPTION

Figure 1:
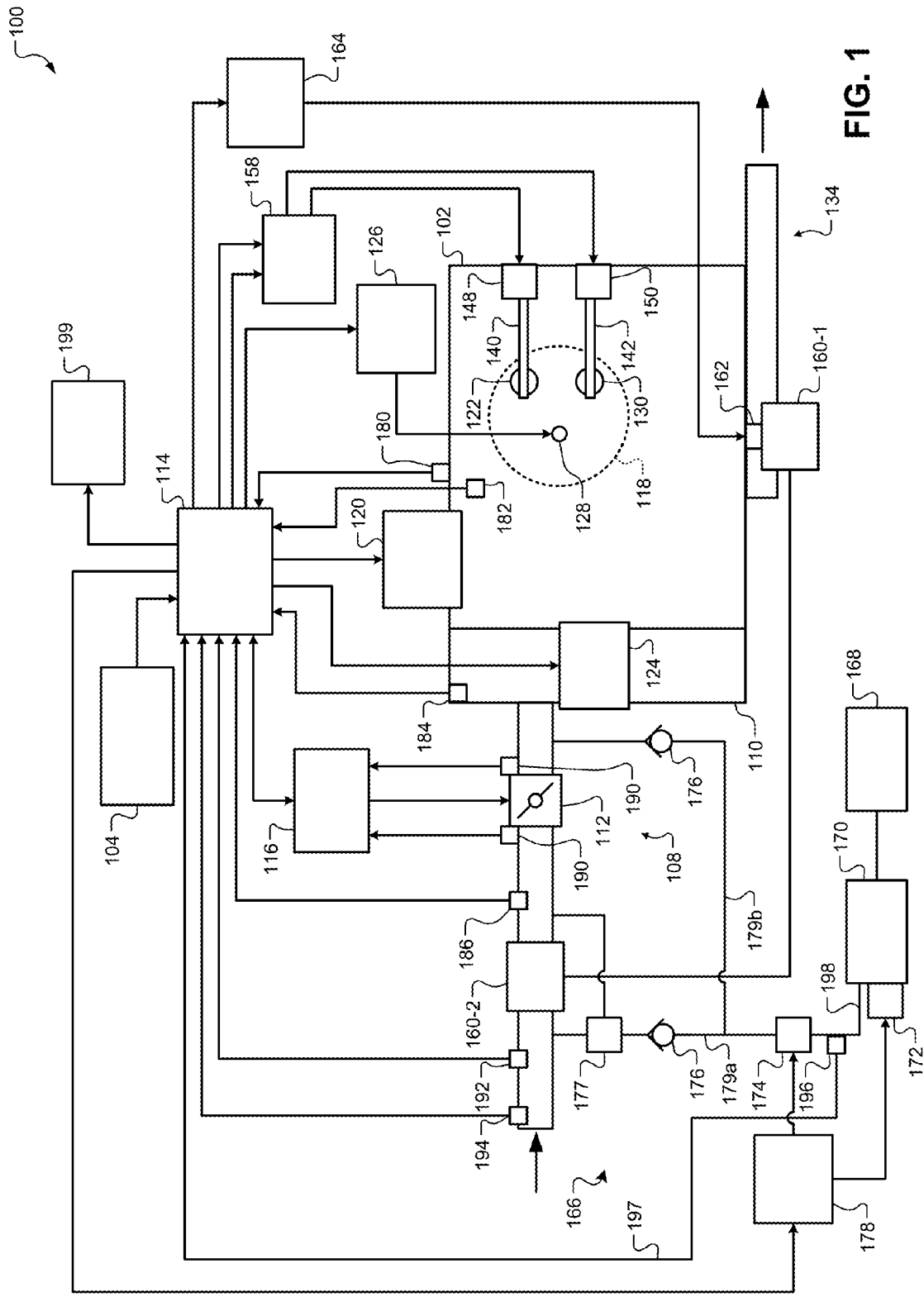
FIG. 1 is a functional block diagram of an example engine system according to the principles of the present disclosure.

A fuel system may include a fuel tank and an evaporative emissions (EVAP) system that collects fuel vapor from the fuel tank and selectively provides the fuel vapor to the engine, which combusts the fuel vapor. The EVAP system may include a canister, a vent valve, a diurnal control valve (on a sealed fuel system), and a purge valve. The canister adsorbs fuel vapor from a fuel tank. The vent valve allows ambient air to enter the canister when the vent valve is open. The purge valve allows fuel vapor to flow from the canister to an intake system of the engine. A vacuum in the intake system may draw fuel vapor from the canister to the intake system when the vent valve is open to allow airflow through the canister and the purge valve is open to allow the fuel vapor to enter the intake system. Thus, instead of venting fuel vapor from the fuel tank directly into the atmosphere, the fuel vapor is combusted in the engine, which reduces emissions and improves fuel economy.

A control system may perform a diagnostic to ensure that the EVAP system is functioning properly. During the diagnostic, the control system may close the vent valve and open the purge valve to create a vacuum in the fuel system. The control system may then monitor pressure in the fuel system during a diagnostic period using a pressure sensor. If the pressure decreases by an amount that is less than a threshold, indicating that flow through the purge valve is insufficient, the control system may diagnose a fault in the EVAP system.

If the engine is equipped with a boost device such as a turbocharger, the control system may not perform the diagnostic during boost operation due to the amount time required to perform the diagnostic. During the diagnostic, the pressure in the sealed portion of the fuel system may be monitored for a diagnostic period of 20 to 30 seconds to allow a vacuum to build up within the fuel system. However, boost operation may only last for a period of 5 to 10 seconds, and the results of the diagnostic may not be reliable if the boost operation period ends before the diagnostic period ends.

In addition, during the diagnostic, the diagnostic system closes the vent valve to seal the canister from the atmosphere. Thus, atmospheric air is not allowed to flow through the canister, and therefore fuel vapor is not purged from the canister to the intake system during the diagnostic. As a result, performing the diagnostic may reduce the amount by which the EVAP system may reduce emissions and improve fuel economy.

Flow through a purge valve can be diagnosed based on a fuel system pressure sensor. Specifically, a variation in a signal generated by the pressure sensor can be determined. A fault associated with flow through the purge valve can be diagnosed based on the pressure variation. The purge valve opens and closes at a frequency with an opening period that is based on a duty cycle of the purge valve. As the purge valve opens and closes, flow through the purge valve causes changes in the pressure signal. However, if there is a flow restriction in the purge valve, the pressure signal may not vary as much as expected based on the duty cycle of the purge valve. A fault associated with flow through the purge valve may be diagnosed when the pressure variation is less than a threshold. The threshold may be determined based on a predetermined relationship between a flow restriction in the purge valve and the pressure variation.

The pressure signal may be monitored for a relatively short period (e.g., one second) to determine the pressure variation. The diagnostic may be performed to evaluate flow through the purge valve during boost operation. In addition, the vent valve may be open or closed when the system and method performs the diagnostic. Thus, performing the diagnostic may not reduce the amount by which the EVAP system may reduce emissions and improve fuel economy.

In some instances, the fuel system pressure sensor may be noisy. For example, the fuel system pressure sensor may generate electrical noise. Alternatively or additionally, the fuel system pressure sensor may be subjected to noise generated by engine firing. The noise may affect the reliability of the EVAP purge flow diagnostic. For example, a noisy fuel system pressure sensor may falsely indicate that the EVAP system is purging and that the purge flow diagnostic passed when in fact the EVAP system is not purging due to a failure in the EVAP system.

A system and method according to the present disclosure perform a diagnostic of the fuel system pressure sensor when the vehicle is started and purging is yet to begin. Specifically, when the vehicle is started and before purging begins, the system and method determines a variation in a signal generated by the pressure sensor. The system and method determines if the variation is less than or equal to a predetermined threshold. If the variation is less than a threshold, the pressure sensor is determined to be not noisy and reliable to perform subsequent EVAP purge flow diagnostic. If the variation is greater than or equal to the threshold, the pressure sensor is determined to be noisy, not reliable to perform subsequent EVAP purge flow diagnostic, and must be replaced.

Referring to FIG. 1, an engine system 100 includes an engine 102 that combusts an air/fuel mixture to produce drive torque for a vehicle based on driver input from a driver input module 104. The driver input may be based on a position of an accelerator pedal. The driver input may also be based on a cruise control system, which may be an adaptive cruise control system that varies vehicle speed to maintain a predetermined following distance.

Air is drawn into the engine 102 through an intake system 108. The intake system 108 includes an intake manifold 110 and a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders, which may improve fuel economy under certain engine operating conditions.

The engine 102 may operate using a four-stroke cycle. The four strokes, described below, are named the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations, fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression in the cylinder 118 ignites the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders.

Generating the spark may be referred to as a firing event. The spark actuator module 126 may have the ability to vary the timing of the spark for each firing event. The spark actuator module 126 may also be capable of varying the spark timing for a next firing event when the spark timing signal is changed between a last firing event and the next firing event. In various implementations, the engine 102 may include multiple cylinders and the spark actuator module 126 may vary the spark timing relative to TDC by the same amount for all cylinders in the engine 102.

During the combustion stroke, the combustion of the air/fuel mixture drives the piston down, thereby driving the crankshaft. The combustion stroke may be defined as the time between the piston reaching TDC and the time at which the piston returns to bottom dead center (BDC). During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118).

The cylinder actuator module 120 may deactivate the cylinder 118 by disabling opening of the intake valve 122 and/or the exhaust valve 130. In various implementations, the intake valve 122 and/or the exhaust valve 130 may be controlled by devices other than camshafts, such as electromagnetic or electrohydraulic actuators.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. When implemented, variable valve lift may also be controlled by the phaser actuator module 158.

The engine system 100 may include a boost device that provides pressurized air to the intake manifold 110. For example, FIG. 1 shows a turbocharger including a hot turbine 160-1 that is powered by hot exhaust gases flowing through the exhaust system 134. The turbocharger also includes a cold air compressor 160-2, driven by the turbine 160-1, that compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) of the turbocharger. The ECM 114 may control the turbocharger via a boost actuator module 164. The boost actuator module 164 may modulate the boost of the turbocharger by controlling the position of the wastegate 162. In various implementations, multiple turbochargers may be controlled by the boost actuator module 164. The turbocharger may have variable geometry, which may be controlled by the boost actuator module 164.

An intercooler (not shown) may dissipate some of the heat contained in the compressed air charge, which is generated as the air is compressed. The compressed air charge may also have absorbed heat from components of the exhaust system 134. Although shown separated for purposes of illustration, the turbine 160-1 and the compressor 160-2 may be attached to each other, placing intake air in close proximity to hot exhaust.

The engine 102 combusts fuel provided by a fuel system 166. The fuel system 166 includes a fuel tank 168, a canister 170, a vent valve 172, a purge valve 174, check valves 176, and a jet pump 177. The canister 170 adsorbs fuel from the fuel tank 168. The vent valve 172 allows atmospheric air to enter the canister 170 when the vent valve 172 is open. The purge valve 174 allows fuel vapor to flow from the canister 170 to the intake system 108 when the purge valve 174 is open. The check valves 176 prevent flow from the intake system 108 to the canister 170. The ECM 114 controls a valve actuator module 178, which regulates the positions of the vent valve 172 and the purge valve 174. The ECM 114 may open the vent valve 172 and the purge valve 174 to purge fuel vapor from the canister 170 to the intake system 108.

Fuel vapor flows from the canister 170 to the intake system 108 through a first flow path 179a or a second flow path 179b. When the boost device is operating (e.g., when the wastegate 162 is closed), the pressure at the outlet of the first flow path 179a is less than the pressure at the outlet of the second flow path 179b. Thus, fuel vapor flows from the canister 170 to the intake system 108 through the first flow path 179a. When the boost device is not operating (e.g., when the wastegate 162 is open), the pressure at the outlet of the first flow path 179a is greater than the pressure at the outlet of the second flow path 179b. Thus, fuel vapor flows from the canister 170 to the intake system 108 through the second flow path 179b.

When the boost device is operating, the pressure of intake air upstream from the compressor 160-2 is less than the pressure of intake air downstream from the compressor 160-2. The jet pump 177 utilizes this pressure difference to create a vacuum that draws fuel vapor from the canister 170 into the intake system 108. The fuel vapor flows through the jet pump 177 and enters the intake system 108 upstream from the compressor 160-2.

The engine system 100 may measure the position of the crankshaft using a crankshaft position (CKP) sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum, which is the difference between ambient air pressure and the pressure within the intake manifold 110, may be measured. The mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. The temperature of ambient air being drawn into the engine 102 may be measured using an intake air temperature (IAT) sensor 192. The pressure of ambient air being drawn into the engine 102 may be measured using an ambient air pressure (AAP) sensor 194. The pressure within the fuel system 166 may be measured using a fuel system pressure (FSP) sensor 196. The FSP sensor 196 may generate a signal 197 indicating the fuel system pressure. The FSP sensor 196 may be located in a line 198 extending between the canister 170 and the purge valve 174, as shown, or in the canister 170. The ECM 114 may use signals from the sensors to make control decisions for the engine system 100.

The ECM 114 may also perform a diagnostic to evaluate flow through the purge valve 174. The ECM 114 may determine a variation in the signal 197 generated by the FSP sensor 196 and diagnose a fault associated with flow through the purge valve 174 based on the pressure variation. The ECM 114 may diagnose the fault when the pressure variation is less than a threshold. The ECM 114 may set a diagnostic trouble code (DTC) and/or activate a service indicator 199 when the fault is diagnosed. The service indicator 199 indicates that service is required using a visual message (e.g., text), an audible message (e.g., chime), and/or a tactile message (e.g., vibration).

Figure 2:
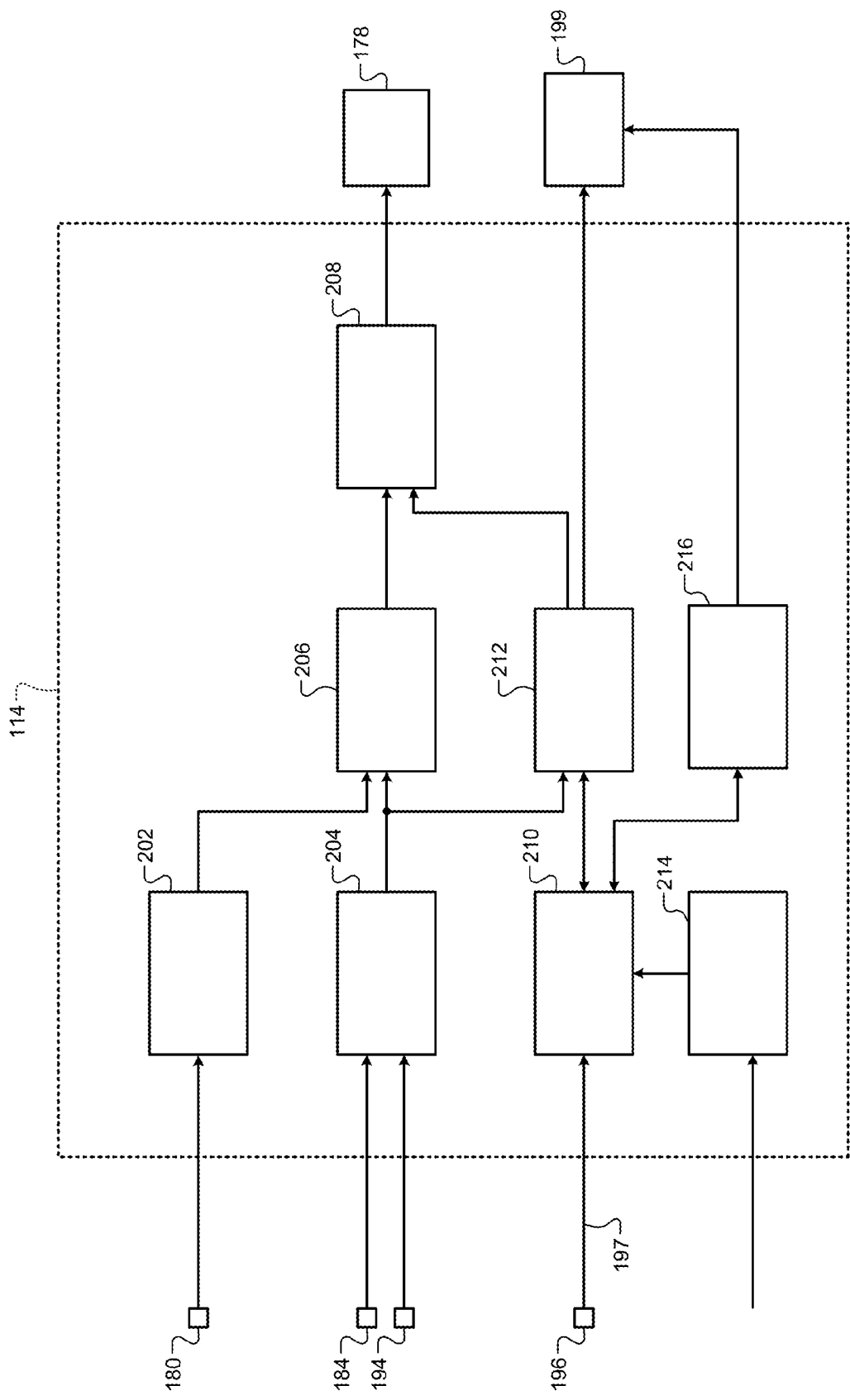
FIG. 2 is a functional block diagram of an example control system according to the principles of the present disclosure.

Referring to FIG. 2, an example implementation of the ECM 114 includes an engine speed module 202, an engine vacuum module 204, a desired purge flow module 206, a valve control module 208, a pressure variation module 210, a purge flow diagnostic module 212, an ignition detection module 214, and a pressure sensor diagnostic module 216. The engine speed module 202 determines engine speed. The engine speed module 202 may determine the engine speed based on the crankshaft position from the CKP sensor 180. For example, the engine speed module 202 may determine the engine speed based on a period of crankshaft rotation corresponding to a number of tooth detections. The engine speed module 202 outputs the engine speed.

The engine vacuum module 204 determines engine vacuum. The engine vacuum module 204 may determine engine vacuum based on the manifold pressure from the MAP sensor 184 and the atmospheric pressure from the AAP sensor 194. The difference between the manifold pressure and the atmospheric pressure may be referred to as engine vacuum when the manifold pressure is less than the atmospheric pressure. The difference between the manifold pressure and the atmospheric pressure may be referred to as boost when the manifold pressure is greater than the atmospheric pressure. The engine vacuum module 204 outputs the engine vacuum (or boost).

The desired purge flow module 206 determines a desired amount of flow through the purge valve 174. The desired purge flow module 206 may determine the desired purge flow based on the engine vacuum and/or the engine speed. The desired purge flow module 206 outputs the desired purge flow.

The valve control module 208 outputs a signal to the valve actuator module 178 to control the positions of the vent valve 172 and the purge valve 174. The valve control module 208 may output a duty cycle to control the position of the purge valve 174. For example, when the duty cycle is set at 25 percent, the purge valve 174 may be open for 25 percent of the time and off for 75 percent of the time. The valve control module 208 may ramp up or ramp down the duty cycle to achieve the desired purge flow.

The pressure variation module 210 determines a variation in the signal 197 generated by the FSP sensor 196. As discussed above, the signal 197 indicates the fuel system pressure. The pressure variation module 210 may determine the pressure variation based on a running total of an absolute difference between a previous pressure reading and a present pressure reading. For example, the pressure variation module 210 may determine a present pressure variation (PV)prs based on the present pressure reading (PR)prs, the previous pressure reading (PR)prv, and a previous pressure variation (PV)prv using a relationship such as $$(PV)prs = |PRprs - PRprv| + (PV)prv \qquad (1)$$

The purge flow diagnostic module 212 diagnoses a fault associated with flow through the purge valve 174 based on the pressure variation over a diagnostic period (e.g., one second). The purge flow diagnostic module 212 may diagnose the fault based on the pressure variation over multiple diagnostic periods (e.g., five one-second periods). The purge flow diagnostic module 212 may perform the diagnostic when the boost device is operating or when the boost device is not operating. The purge flow diagnostic module 212 may output a signal indicating when the diagnostic period begins and ends. The valve control module 208 may maintain the duty cycle of the purge valve 174 at a predetermined percentage (e.g., a percentage within a range from 25 percent to 75 percent) during the diagnostic period. The valve control module 208 may open or close the vent valve 172 during the diagnostic period.

The purge flow diagnostic module 212 may diagnose the fault when the pressure variation is less than a threshold, indicating that a restriction of flow through the purge valve 174 is greater than a desired amount. The purge flow diagnostic module 212 may set a DTC when the fault is diagnosed. The purge flow diagnostic module 212 may activate the service indicator 199 when the DTC is set during two different ignition cycles. During one ignition cycle, an ignition system (not shown) is switched from off to on (or run) and then returned to off. The purge flow diagnostic module 212 may determine the threshold based on a relationship between the flow restriction in the purge valve 174 and the pressure variation. The relationship may be predetermined through empirical testing by determining the pressure variation at various known amounts of flow restriction.

The pressure variation may be affected by the boost. For example, for a given amount of flow restriction in the purge valve 174, the pressure variation may be greater when the boost is relatively high than when the boost is relatively low. The purge flow diagnostic module 212 may adjust the pressure variation based on the boost. For example, the purge flow diagnostic module 212 may normalize the pressure variation with respect to the boost. In turn, the purge flow diagnostic module 212 may use the same threshold to diagnose the fault at different levels of boost. Alternatively, the purge flow diagnostic module 212 may determine the threshold based on the boost.

The pressure sensor diagnostic module 216 diagnoses the FSP sensor 196 over a diagnostic period when the engine is started to ensure that the subsequently performed purge flow diagnostics when the vehicle is operated are reliable. Specifically, the ignition detection module 214 detects when the engine is started (i.e., ignition is turned on). At this time, purge flow control is not turned on, the duty cycle of the purge valve 174 is zero, and the purge valve 173 is closed.

The pressure sensor diagnostic module 216 determines a variation in the signal 197 generated by the FSP sensor 196 over the diagnostic period. As discussed above, the signal 197 indicates the fuel system pressure. The pressure variation module 210 may determine the pressure variation based on a running total of an absolute difference between a previous pressure reading and a present pressure reading. For example, the pressure variation module 210 may determine a present pressure variation (PV)prs based on the present pressure reading (PR)prs, the previous pressure reading (PR)prv, and a previous pressure variation (PV)prv using a relationship such as $$(PV)prs = |PRprs - PRprv| + (PV)prv \qquad (1)$$

The pressure sensor diagnostic module 216 determines that the FSP sensor 196 operates normally (e.g., with acceptable noise level so as to be able to provide reliable purge flow diagnostics) if the amount of variation in the signal 197 over the diagnostic period is less than a predetermined threshold. The pressure sensor diagnostic module 216 determines that the FSP sensor 196 is faulty (e.g., with unacceptable noise level so as to be unable to provide reliable purge flow diagnostics) if the amount of variation in the signal 197 is greater than or equal to the predetermined threshold.

The predetermined threshold is determined based on a leakage rating of the purge valve 173. For example, according to established standards, the worst-case (i.e., maximum allowable) leakage rating of the purge valve 173 may be 0.020. Accordingly, the predetermined threshold may be determined based on a leakage rating of 0.020 or 0.040.

The pressure sensor diagnostic module 216 generates a signal at the end of the diagnostic period to indicate a status of the FSP sensor 196 determined based on the diagnostics performed as above over the diagnostic period. For example, the pressure sensor diagnostic module 216 may generate a signal to indicate that the FSP sensor 196 is faulty if the amount of variation in the signal 197 is greater than or equal to the predetermined threshold.

The pressure sensor diagnostic module 216 may also provide the signal to the purge flow control module 212 at the end of the diagnostic period. The purge flow control module 212 may suspend the purge flow diagnostics if the FSP sensor 196 is faulty and may perform the purge flow diagnostics only if the FSP sensor 196 operates normally. Subsequent to determining that the FSP sensor 196 operates normally, the purge flow control module 212 may perform the purge flow diagnostics as described above, the results of the purge flow diagnostics are reliable. When the FSP sensor 196 is diagnosed to be faulty, the FSP sensor 196 must be replaced or the purge flow diagnostics performed using the faulty FSP sensor 196 may be unreliable.

The diagnostics of the FSP sensor 196 performed as described above when the engine is started and before purge flow control begins may provide many benefits. Without the diagnostics, a noisy FSP sensor 196 may falsely pass the EVAP purge flow diagnostics. The diagnostics of the FSP sensor 196 involve a quick pass/fail decision, increase purge flow volume and can be performed without any additional hardware (e.g., a fuel tank isolation valve).

Without the diagnostics of the FSP sensor 196 described above, alternatives may include not using the EVAP purge flow diagnostics based on the variation method described above. Alternatively, a fuel tank isolation valve can be added between fuel tank and canister so that when the isolation valve is commanded to be closed, the volume on the EVAP system is reduced to only canister volume plus lines. Without the isolation valve, the time to build vacuum is much greater than 10 seconds. If a fuel tank isolation valve is used, however, fuel tank isolation valve diagnostics may be needed. Alternatively, a Canister Vent Solenoid (CVS) can be commanded to be closed while under boosted operation, and sufficient vacuum can be created in the sealed canister. In contrast, the diagnostics of the FSP sensor 196 described above not only do not require any of these alternative, but also make the subsequent EVAP purge flow diagnostics nonintrusive (CVS is open).

Figure 3:
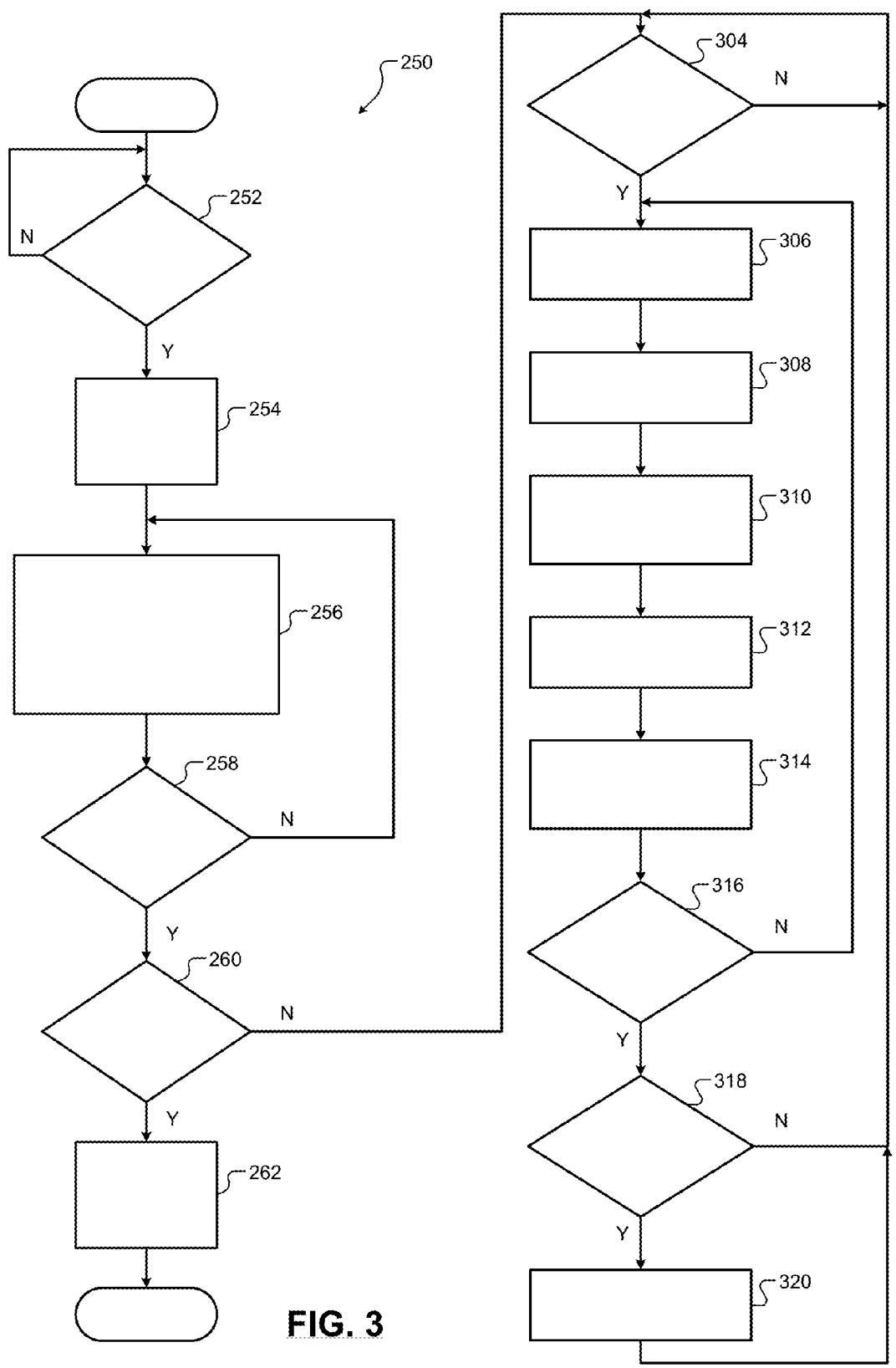
FIG. 3 is a flowchart illustrating an example control method according to the principles of the present disclosure.

Referring to FIG. 3, an example of a method 250 for diagnosing a FSP sensor and subsequently reliably diagnosing a fault associated with flow through a purge valve of a fuel system is shown. At 252, the method determines whether the engine is turned on. The method waits until the engine is turned on. At 254 after the engine is turned on, the method starts a diagnostic period. At 256, with the purge valve closed and before purge flow diagnostics and control begin, the method performs FSP sensor diagnostics. For example, the method may perform the FSP sensor diagnostics using relationship (1) discussed above. At 258, the method determines if the diagnostic period ended. The method returns to 256 if the diagnostic period has not yet ended. At 260, if the diagnostic period has ended, the method determines based on the diagnostics performed whether the FSP sensor is faulty. At 262, if the FSP sensor is faulty, the method lights a service indicator to indicate that the FSP sensor is faulty.

After diagnosing the FSP sensor, the fuel system provides fuel to the engine, which may be equipped with a boost device such as a turbocharger. At 304, the method determines whether to start a diagnostic period to perform EVAP purge flow diagnostics. The method may start the diagnostic period when the boost device is operating or when the boost device is not operating. The method waits until the diagnostic period starts.

At 306, after the diagnostic period starts, the method monitors engine vacuum. The method may determine engine vacuum based on a difference between pressure within an intake manifold of the engine and atmospheric pressure. The difference between the manifold pressure and the atmospheric pressure may be referred to as engine vacuum when the manifold pressure is less than the atmospheric pressure. The difference between the manifold pressure and the atmospheric pressure may be referred to as boost when the manifold pressure is greater than the atmospheric pressure.

At 308, the method monitors pressure within the fuel system. The method may measure the fuel system pressure using a pressure sensor that generates a signal indicating the fuel system pressure. At 310, the method maintains a duty cycle of a purge valve of the fuel system at a predetermined percentage (e.g., a percentage within a range from 25 percent to 75 percent). In addition, the method may open or close a vent valve of the fuel system during the diagnostic period.

At 312, the method determines a variation of the signal generated by the pressure sensor. The method may determine the pressure variation based on a running total of an absolute difference between a previous pressure reading and a present pressure reading. For example, the method may determine the pressure variation using relationship (1) discussed above. At 314, the method adjusts the pressure variation based on amount of boost provided to the engine during the diagnostic period. For example, the method may normalize the pressure variation with respect to the boost.

At 316, the method determines whether to stop the diagnostic period. The method may stop the diagnostic period when a predetermined period (e.g., one second) elapses after the method starts the diagnostic period. If method decides to stop the diagnostic period, the method continues at 318. Otherwise, the method continues at 306. In various implementations, the method may determine the pressure variation over multiple diagnostic periods (e.g., five one-second periods).

At 318, the method determines whether the pressure variation is less than a threshold. The method may determine the threshold based on a relationship between the flow restriction in the purge valve and the pressure variation. The relationship may be predetermined through empirical testing by determining the pressure variation at various known amounts of flow restriction. The method may also determine the threshold based on the boost when, for example, the pressure variation is not normalized with respect to the boost. If the pressure variation is less than the threshold, the method continues at 320. Otherwise, the method continues at 304.

At 320, the method diagnoses a fault associated with a flow restriction in the purge valve. The method may set a DTC when the fault is diagnosed. The method may activate a service indicator when the DTC is set during two different ignition cycles. The detection of the fault associated with the flow restriction in the purge valve may be reliable if the FSP sensor diagnostics passed. The detection of the fault associated with the flow restriction in the purge valve may be unreliable if the FSP sensor diagnostics failed.

Figure 4:
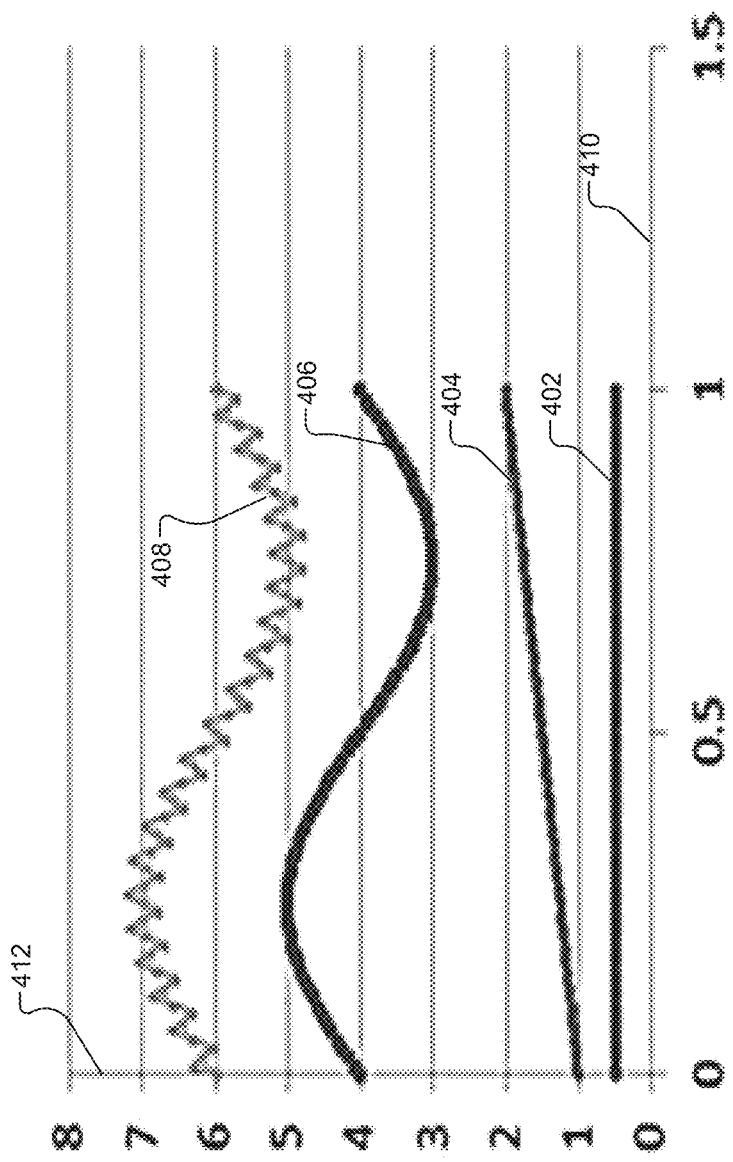
FIG. 4 is a graph illustrating example pressure sensor signals according to the principles of the present disclosure.

Referring to FIG. 4, examples of signals that may be generated by a fuel system pressure sensor during a one-second diagnostic period are shown at 402, 404, 406, and 408. The signals 402, 404, 406, and 408 are plotted with respect to an x-axis 410 and a y-axis 412. The x-axis 410 represents time in seconds. The y-axis 412 represents unitless magnitudes of the signals.

The variation of each of the signals 402, 404, 406, and 408 may be determined using relationship (1) discussed above. If relationship (1) is used to determine the variations, the variations of the signals 402, 404, 406, and 408 are 0, 1, 4, and 16, respectively. Thus, the variation determined using relationship (1) increases as the amount of change or variation in the signals 402, 404, 406, and 408 increases.

Figure 5:
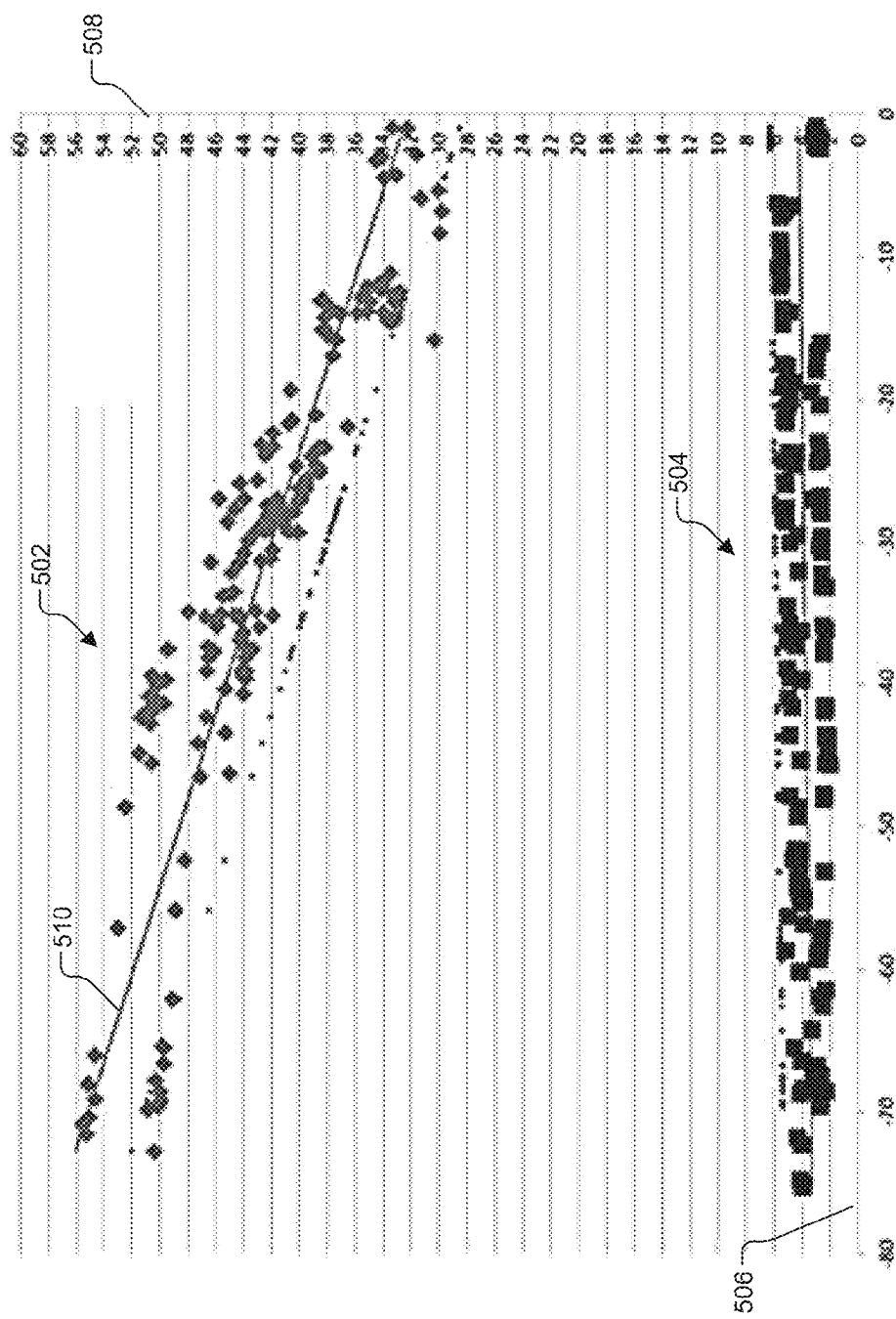
FIGS. 5 and 6 are graphs illustrating example values for diagnosing flow through a purge valve according to the principles of the present disclosure.

Referring to FIG. 5, a first set of pressure variation amounts 502 and a second set of pressure variation amounts 504 are plotted with respect to an x-axis 506 and a y-axis 508. The x-axis 506 represents engine vacuum in kilopascals (kPa). The y-axis 508 represents the pressure variation per second. Since the values along the x-axis 506 are all negative, the x-axis 506 may be referred to as representing the amount of boost provided to an engine. The boost amount is equal in magnitude to the values along the x-axis 506, but is opposite in polarity.

The pressure variation amounts 502 correspond to a first amount of flow restriction within a purge valve. In this example, a purge flow path without any flow restriction has a diameter of 0.197 inches (in) and a cross-sectional area of 0.0304 square inches (in$^2$), and the first amount of flow restriction has a cross-sectional area of 0.0182 in$^2$. Thus, the purge flow path as restricted by the first amount of flow restriction has a diameter of 0.125 in and a cross-sectional area of 0.0123 in$^2$. The first amount of flow restriction may correspond to a worst performing acceptable amount of purge flow.

The pressure variation amounts 504 correspond to a second amount of flow restriction within the purge valve. The second amount of flow restriction is has a cross-sectional area of 0.0292 in$^2$. Thus, the purge flow path as restricted by the second amount of flow restriction has a diameter of 0.040 in and a cross-sectional area of 0.001 in$^2$. The second amount of flow restriction may correspond to a best performing unacceptable amount of purge flow.

A best fit line 510 through the pressure variation amounts 502 may be obtained using linear regression. A threshold for diagnosing a purge flow fault may be determined by subtracting an offset from the best fit line 510. Since the pressure variation amounts 502 increase as the boost increases, the threshold may also increase as the boost increases.

Figure 6:
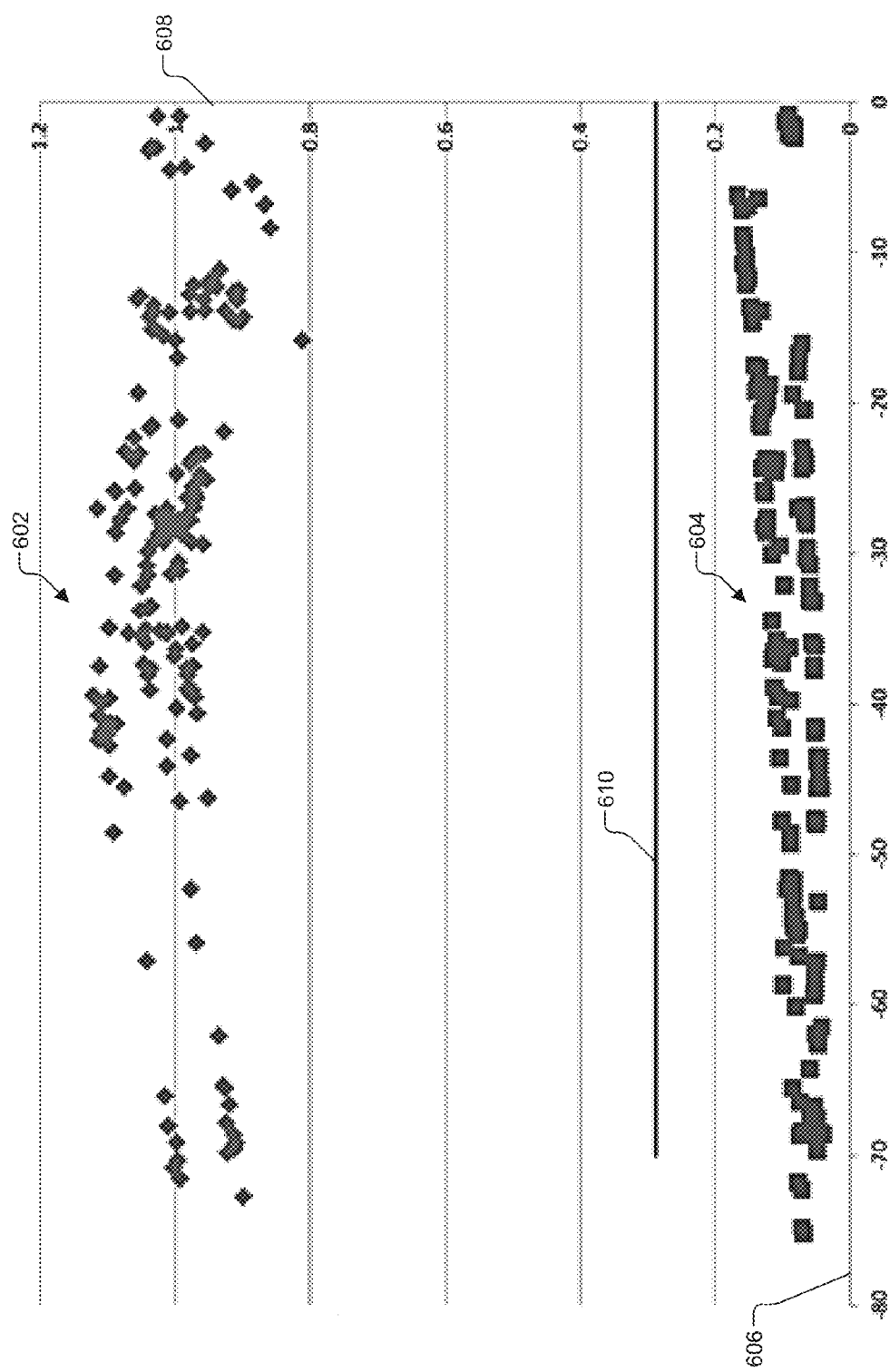

Referring to FIG. 6, a first set of pressure variation amounts 602 and a second set of pressure variation amounts 604 are plotted with respect to an x-axis 606 and a y-axis 608. The x-axis 606 represents engine vacuum in kPa. The y-axis 608 represents the pressure variation per second. Since the values along the x-axis 606 are all negative, the x-axis 606 may be referred to as representing the amount of boost provided to an engine. The boost amount is equal in magnitude to the values along the x-axis 606, but is opposite in polarity.

The pressure variation amounts 602, 604 are obtained by normalizing the pressure variation amounts 502, 504 of FIG. 5 with respect to boost. The pressure variation amounts 502, 504 are normalized by dividing the pressure variation amounts 502, 504 by their respective best fit lines. A threshold 610 for diagnosing a purge flow fault is determined by adding an offset to a best fit line of the pressure variation amounts 604. For example, the threshold 610 may be equal to a sum of an average of the pressure variation amounts 502 and a product of a multiplier (e.g., 4) and the standard deviation of the pressure variation amounts 502. Since the pressure variation amounts 602, 604 are normalized with respect to boost, a single-value threshold (e.g., 0.3) may be used to diagnose a fault associated with flow through a purge valve regardless of the boost amount.

Referring to FIG. 7, an example of results of FSP sensor diagnostics performed according to the present disclosure are shown. A first set of pressure variation amounts 702 and a second set of pressure variation amounts 704 are plotted with respect to an x-axis 706 and a y-axis 708. The x-axis 706 represents engine vacuum in kPa. The y-axis 708 represents the pressure variation per second as sensed by. A threshold 710 is based on a permissible leakage through the purge valve.

If the FSP sensor diagnostics result in the first set of pressure variation amounts 702 that are greater than the threshold 710, the FSP sensor is noisy and must be replaced. The EVAP purge flow diagnostics and control subsequently performed using the noisy FSP sensor may be unreliable. If the FSP sensor diagnostics result in the second set of pressure variation amounts 704 that are less than the threshold 710, the FSP sensor operates normally. The EVAP purge flow diagnostics and control subsequently performed using the FSP sensor are reliable.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A system comprising:
a pressure sensor that generates a first pressure signal indicating a first pressure within a fuel system of an engine when the engine is started and when a purge valve of the fuel system is closed; and
a controller configured to:
detect when the engine is started,
determine an amount of variation in the first pressure signal over a first period,
determine a state of the pressure sensor based on the amount of variation in the first pressure signal over the first period, and
determine that the pressure sensor operates normally if the amount of variation in the first pressure signal is less than a first threshold and that the pressure sensor is faulty if the amount of variation in the first pressure signal is greater than or equal to the first threshold,
wherein the first threshold is determined based on a leakage rating of the purge valve, and
wherein the leakage rating of the purge valve is non-zero.

2. The system of claim 1 wherein the controller is configured to determine the amount of variation in the first pressure signal based on a difference between a current pressure reading and a previous pressure reading, an absolute value of the difference between the current pressure reading and the previous pressure reading, and a running total of the absolute value of the difference between the current pressure reading and the previous pressure reading over the first period.

3. The system of claim 1 wherein the pressure sensor subsequently generates a second pressure signal indicating a second pressure within the fuel system when the purge valve of the fuel system is cycled at a duty cycle, wherein the controller is configured to determine an amount of variation in the second pressure signal over a second period, and wherein the controller is further configured to:
diagnose a fault associated with flow through the purge valve if the amount of variation in the first pressure signal is less than the first threshold and the amount of variation in the second pressure signal is less than a second threshold.

4. The system of claim 3 wherein the controller is configured to determine the amount of variation in the second pressure signal based on a difference between a current pressure reading and a previous pressure reading, an absolute value of the difference between the current pressure reading and the previous pressure reading, and a running total of the absolute value of the difference between the current pressure reading and the previous pressure reading over the second period.

5. The system of claim 3 wherein the controller is configured to determine the second threshold based on a predetermined relationship between a flow restriction in the purge valve and the amount of variation in the second pressure signal.

6. The system of claim 3 wherein the controller is configured to adjust the amount of variation in the second pressure signal based on an amount of boost provided to the engine during the second period.

7. The system of claim 3 wherein the controller is configured to determine the second threshold based on an amount of boost provided to the engine.

8. The system of claim 3 wherein the controller is further configured to control the duty cycle of the purge valve at a predetermined value during the second period.

9. The system of claim 3 wherein the controller is further configured to open a vent valve of the fuel system during the second period.

10. A method comprising:
    detecting when an engine is started;
    generating, using a pressure sensor, a first pressure signal indicating a first pressure within a fuel system of the engine when the engine is started and when a purge valve of the fuel system is closed;
    determining an amount of variation in the first pressure signal over a first period;
    determining a state of the pressure sensor based on the amount of variation in the first pressure signal over the first period;
    determining that the pressure sensor operates normally if the amount of variation in the first pressure signal is less than a first threshold and that the pressure sensor is faulty if the amount of variation in the first pressure signal is greater than or equal to the first threshold; and
    determining the first threshold based on a leakage rating of the purge valve,
    wherein the leakage rating of the purge valve is non-zero.

11. The method of claim 10 further comprising determining the amount of variation in the first pressure signal based on a difference between a current pressure reading and a previous pressure reading, an absolute value of the difference between the current pressure reading and the previous pressure reading, and a running total of the absolute value of the difference between the current pressure reading and the previous pressure reading over the first period.

12. The method of claim 10 further comprising:
    subsequently generating a second pressure signal indicating a second pressure within the fuel system when the purge valve of the fuel system is cycled at a duty cycle;
    determining an amount of variation in the second pressure signal over a second period; and
    diagnosing a fault associated with flow through the purge valve if the amount of variation in the first pressure signal is less than the first threshold and the amount of variation in the second pressure signal is less than a second threshold.

13. The method of claim 12 further comprising determining the amount of variation in the second pressure signal based on a difference between a current pressure reading and a previous pressure reading, an absolute value of the difference between the current pressure reading and the previous pressure reading, and a running total of the absolute value of the difference between the current pressure reading and the previous pressure reading over the second period.

14. The method of claim 12 further comprising determining the second threshold based on a predetermined relationship between a flow restriction in the purge valve and the amount of variation in the second pressure signal.

15. The method of claim 12 further comprising adjusting the amount of variation in the second pressure signal based on an amount of boost provided to the engine during the second period.

16. The method of claim 12 further comprising determining the second threshold based on an amount of boost provided to the engine.

17. The method of claim 12 further comprising maintaining the duty cycle of the purge valve at a predetermined value during the second period.

18. The method of claim 12 further comprising opening a vent valve of the fuel system during the second period.

* * * * *